US007443576B2

(12) United States Patent
Eiselt

(10) Patent No.: US 7,443,576 B2
(45) Date of Patent: Oct. 28, 2008

(54) COMPENSATION FOR SPECTRAL POWER TILT FROM SCATTERING

(75) Inventor: Michael H. Eiselt, Middletown, NJ (US)

(73) Assignee: Pivotal Decisions LLC, Las Vegas, NV (US)

( * ) Notice: Subject to any disclaimer, the term of this patent is extended or adjusted under 35 U.S.C. 154(b) by 0 days.

(21) Appl. No.: 11/515,438

(22) Filed: Aug. 31, 2006

(65) Prior Publication Data

US 2007/0086081 A1 Apr. 19, 2007

Related U.S. Application Data

(62) Division of application No. 10/427,898, filed on Apr. 30, 2003.

(60) Provisional application No. 60/377,084, filed on Apr. 30, 2002.

(51) Int. Cl.
*H04B 10/17* (2006.01)
*H04B 10/12* (2006.01)

(52) U.S. Cl. .............................. 359/337.1; 359/337.11

(58) Field of Classification Search ............. 359/337.1, 359/337.11
See application file for complete search history.

(56) References Cited

U.S. PATENT DOCUMENTS 4,229,831 A 10/1980 Lacher ...................... 398/214
4,535,459 A 8/1985 Hogge, Jr. ................... 375/324
4,636,859 A 1/1987 Vernhet et al. ............. 348/468
4,710,022 A 12/1987 Soeda et al. ............... 356/73.1
5,224,183 A 6/1993 Dugan ......................... 385/24
5,225,922 A 7/1993 Chraplyvy et al. ............ 398/94
5,267,071 A 11/1993 Little et al. ................ 398/162
5,299,048 A 3/1994 Suyama ...................... 398/181
5,321,541 A 6/1994 Cohen ......................... 398/82
5,455,703 A 10/1995 Duncan et al. .............. 398/136
5,559,625 A 9/1996 Smith et al. .................. 398/66
5,613,210 A 3/1997 Van Driel et al. ............. 455/45
5,726,784 A 3/1998 Alexander et al. ............ 398/91
5,737,118 A 4/1998 Sugaya et al. .......... 359/341.43
5,778,116 A 7/1998 Tomich ....................... 385/16
5,790,285 A 8/1998 Mock .......................... 398/21
5,812,290 A 9/1998 Maeno et al. ................. 398/45
5,877,881 A 3/1999 Miyauchi et al. ............ 398/193
5,903,613 A 5/1999 Ishida ........................ 375/340
5,914,794 A 6/1999 Fee ............................ 398/20
5,914,799 A 6/1999 Tan ............................ 398/92
5,936,753 A 8/1999 Ishikaawa .................... 398/72

(Continued)

FOREIGN PATENT DOCUMENTS

JP 01115230 5/1989

(Continued)

*Primary Examiner*—Eric Bolda
(74) *Attorney, Agent, or Firm*—Woodcock Washburn LLP

(57) ABSTRACT

A method and apparatus for adjusting the tilt of an inline amplifier. A controller reads the power of an amplifier twice. Then, if there is a change in power, a difference is calculated by subtracting the first power from the second power. A tilt correction is calculated by multiplying the change in power by a negative constant. The system then adjusts a gain control device by the tilt correction. Because of the simplicity of the algorithm and location of the controller, adjustments can be made to the gain tilt within approximately 100 μs and system failures cam be avoided.

26 Claims, 6 Drawing Sheets

Read and store a 1st Output power 500
Read and store a 2nd output power 505
Calculate |ΔP| 510
515
|ΔP| < Threshold?
Yes
No
520
Calculate ΔT
Delta Tilt = (CONST)*Delta P
525
Adjust Tilt Control

U.S. PATENT DOCUMENTS 5,940,209 A 8/1999 Nguyen ................... 359/341.1
5,963,350 A 10/1999 Hill ............................ 398/70
5,963,361 A 10/1999 Taylor et al. ................ 359/337
5,995,694 A 11/1999 Akasaka et al. ............ 340/7.37
6,005,702 A 12/1999 Suzuki et al. ............... 398/185
6,021,245 A 2/2000 Berger et al. ................ 385/123
6,038,061 A 3/2000 Sugaya ....................... 359/337
6,038,062 A 3/2000 Kosaka ....................... 359/337
6,075,634 A 6/2000 Casper et al. ............... 398/139
6,078,414 A 6/2000 Iwano ........................ 398/182
6,081,360 A 6/2000 Ishikawa et al. ............ 398/147
6,084,694 A 7/2000 Milton et al. ................. 398/83
6,088,152 A 7/2000 Berger et al. ................ 359/334
6,108,074 A 8/2000 Bloom ...................... 356/73.1
6,122,095 A 9/2000 Fatehi ........................ 359/337
6,151,334 A 11/2000 Kim et al. ................... 370/468
6,157,477 A 12/2000 Robinson .................... 398/147
6,160,614 A 12/2000 Unno ........................ 356/73.1
6,163,392 A 12/2000 Condict et al. ................. 398/1
6,317,231 B1 11/2001 Al-Salameh et al. .......... 398/34
6,317,255 B1 11/2001 Fatehi et al. ........... 359/341.44
6,323,950 B1 11/2001 Kim et al. ................... 356/477
6,327,060 B1 12/2001 Otani et al. ................... 398/83
6,356,384 B1 3/2002 Islam ......................... 359/334
6,359,729 B1 3/2002 Amoruso ................. 359/341.1
6,377,394 B1 4/2002 Drake et al. ........... 359/341.41
6,388,801 B1 5/2002 Sugaya et al. ............... 359/334
6,396,853 B1 5/2002 Humphrey et al. .......... 370/535
6,421,169 B1 7/2002 Bonnedal et al. ......... 359/337.1
6,429,962 B1 * 8/2002 Xu et al. .................. 359/337.1
6,456,427 B1 9/2002 Chen et al. ............... 359/337.1
6,480,326 B2 11/2002 Papernyl et al. ............. 359/334
6,515,779 B2 2/2003 Fee ........................... 359/161
6,519,082 B2 2/2003 Ghera et al. ............. 359/341.4
6,522,460 B2 2/2003 Bonnedal et al. ....... 359/341.42
6,574,037 B2 6/2003 Islam et al. ................. 359/334
6,603,596 B2 8/2003 Inagaki et al. ............ 359/341.4
6,687,045 B2 2/2004 Lelic ....................... 359/337.1
6,728,026 B2 4/2004 Lee et al. ................. 359/337.1
6,744,958 B2 6/2004 Inagaki et al. ............... 385/123
6,744,988 B2 6/2004 Leclerc et al. .............. 398/102
6,807,232 B2 10/2004 Nicholson et al. ...... 375/240.26
6,826,201 B2 11/2004 Hind .......................... 370/535
6,943,937 B2 9/2005 Lelic et al. ............. 359/337.11
6,944,163 B2 9/2005 Bottorff et al. ........... 370/395.5
6,950,448 B2 9/2005 Tornetta et al. ............. 370/537
7,016,105 B2 3/2006 Balland et al. ........... 359/337.1
7,046,695 B2 5/2006 Silvers ....................... 370/493
7,061,668 B2 6/2006 Maurer et al. .......... 359/341.41
7,139,277 B2 11/2006 Ofek et al. .................. 370/401
7,170,906 B2 1/2007 Ofek et al. .................. 370/498
2001/0050802 A1 * 12/2001 Namiki et al. ......... 359/337.11
2002/0012152 A1 1/2002 Agazzi et al. ............... 359/189
2002/0044317 A1 4/2002 Gentner et al. .............. 359/124
2002/0044324 A1 4/2002 Hoshida et al. ............. 359/179
2002/0044343 A1 * 4/2002 Manzur ................. 359/337.11
2002/0181045 A1 * 12/2002 Uda et al. ................... 359/124
2003/0035203 A1 2/2003 Shlifer et al. ............ 359/337.1

FOREIGN PATENT DOCUMENTS

JP 02238736 9/1990
JP 2002368692 A * 12/2002

* cited by examiner

Fiber input
λ
2A
Fiber output = ILA input
λ
2B
ILA gain
λ
2C
ILA output
λ
2D

COMPENSATION FOR SPECTRAL POWER TILT FROM SCATTERING

CROSS-REFERENCE TO RELATED APPLICATIONS

This application is a divisional application under 35 U.S.C. § 121 of U.S. application Ser. No. 10/427,898, filed Apr. 30, 2003 entitled "Compensation For Spectral Power Tilt From Scattering". This application claims priority to Provisional Application Ser. No. 60/377,084, entitled "Compensation for Spectral Power Tilt from Stimulated Raman Scattering" by Eiselt, filed Apr. 30, 2002.

FIELD OF THE INVENTION

The present invention relates generally to optical amplifiers used in fiber optics for telecommunications. More particularly, the invention relates to Raman Scattering and dynamic self-adjusting gain tilt optimization for equalizing amplified optical output.

BACKGROUND OF THE INVENTION

In optical fiber communication systems, communication channels can be provided by transmitting signals impressed on laser beams having different wavelengths (WDM). Although optical fiber communication systems utilizing wavelength distinct modulated channels may, carry information over long distances, signals transmitted through optical fibers are attenuated mainly by the cumulative and combined effects of absorption and Rayleigh Scattering. While the signal attenuation per kilometer in optical fibers used for communications is typically low, signals transmitted over increasing transmission distances require periodic amplification.

Stimulated Raman Scattering induces a power tilt over. the signals within the C-band and L-band range of transmission frequencies. The power tilt is linear in first order on a logarithmic scale and depends on the overall signal and noise power injected into the fiber and on the fiber Raman coefficient. The tilt does not depend on the distribution of the channels within the band. For instance, the tilt per span amounts to about 0.7 dB per 100 mW signal power in single mode optical fiber (SMF) and about 1 d13 per 100 mW signal power in LEAF. In this example, tilt can be defined as the difference in span loss between channel #80 (around 1603 nm) and channel #1 (around 1570 nm). The tilt accumulates linearly (in dB) with the number of spans of optical fiber.

FIG. 1 shows a simplified view of a transport system including a fiber span 210 as is typical in the art. Several inline amplifiers (ILAs) 200 are connected in series in order to transport a signal hundreds or thousands of kilometers.

In the prior art, the Raman power tilt is compensated for by introducing a gain tilt in an ILA. FIG. 2A shows the input power to into ILA 200. FIG. 2B shows the power tilt of the to signal after Stimulated Raman Scattering on the fiber. FIG. 2C shows the ILA compensation gain tilt used to correct or compensate for the power tilt. FIG. 2D shows the corrected output of ILA 200.

When channels are accidentally dropped, for example, due to a fiber cut or equipment failure, ILAs 200 maintain the overall gain constant by adjusting the amplifiers to take into account the lower ILA, input power. However, as a lower channel count on the fiber leads to a reduced power tilt, the ILAs typically overcompensate for the power tilt and introduce a negative power tilt as shown in FIG. 5.

FIG. 5A shows the fiber input power of a signal with fifty percent fewer channels than shown in FIG. 2A. FIG. 5B shows the power tilt over the signal after Stimulated Raman Scattering. FIG. 50 shows the TLA compensation gain tilt used to correct or compensate for the power tilt. FIG. 5D shows a gain tilt adjustment after the loss of channels. The ILAs now overcompensate for the power tilt and introduce a negative power tilt. The negative power tilt accumulates in the system and can typically reach values of more than 5 dB. For example, if 20 Channels are dropped, at 3 dBm each, with 20 spans of LEAF a greater than 8 dB power tilt can. be introduced. Such a power tilt usually causes system failure.

Certain prior art systems have attempted to address this problem with varying success. U.S. Pat. No. 6,088,152 to Berger et al, entitled "Optical Amplifier Arranged To Offset Raman Gain", discloses an invention wherein an optical amplifier adjusts the gain. that the amplifier applies to optical signals so the gain favors the signal components at the low end of the bandwidth. A program uses a value representing power into the fiber to index a fable of pre-tilt values. The program then determines the difference between a pre-tilt value read out of the table and a pre-tilt value obtained from an optical monitor and adjusts a variable attenuator unit as a function of the difference to obtain the desired pre-tilt of the output signal. The Berger system is comparatively slow. It also requires a static lookup table that must be reprogrammed upon certain fiber or amplifier changes.

U.S. Pat. No. 6,356,384 to Islam, entitled "Broadband Amplifier And Communication System", discloses a tilt control device to control gain tilt coupled to splitters, Raman amplifiers, EDFAs and combiners. Islam does not, disclose or suggest a method or controller system for fast automatic tilt correction of gain control.

United States Patent Application Publication No. 2042/0044317 to Gentner, et al., entitled "Control Method And Optical Data Transmission Path For Compensating Changes In Srs-Induced Power Exchange", discloses a device for determining the tilt of all optical spectrums, and then using a quick control and slow control for compensating the tilt. Gentner requires laser equipment for quick response to power fluctuations which raises system cost and complexity.

Therefore, a need exists for a method and a device which permits compensation of the titling of the spectrum fast enough to prevent system shutdown upon loss of channels, and cheaply enough to reduce the cost of deployment in an optical transport system.

SUMMARY OF THE INVENTION

The present invention is an improvement over the prier art by providing a control scheme that can perform fast automatic tilt correction.

The present invention recognizes that the gain tilt is proportional to the fiber input power. As a result, the measured fiber output power (or ILA input power) if scaled by the span loss, can be used to adjust the ILA gain tilt. ILA gain tilt adjustment is then used to offset the tilt induced by Raman Scattering in a rapid automatic fashion to avoid system shutdown due to accidental loss of channels. A controller continuously reads the output power of the ILA and compares it to an earlier value. A change in output power is calculated by subtracting the current ILA output power from the past ILA. output power. After the change in output power is calculated, a change in the ILA gain tilt is calculated by multiplying the change in output power by a negative constant. A negative constant produces a positive change in tilt when channels are dropped. The controller transmits a control signal to the ILA to make the necessary corrections. The tilt control hardware and algorithm are incorporated into the ILA hardware. Because of the simplicity of the algorithm and the proximity of the hardware to the ILA, adjustments can be made to the gain tilt within approximately 100 μs. System failures caused by negative tilt accumulation are avoided.

The invention will be better understood from the following more detailed description taken in conjunction with the accompanying drawings.

DETAILED DESCRIPTION OF THE DRAWINGS

A better understanding of the invention can be obtained from the following detailed description of one exemplary embodiment as considered in conjunction with the following drawings in which.

DETAILED DESCRIPTION OF EXEMPLARY EMBODIMENTS

Figure 4:
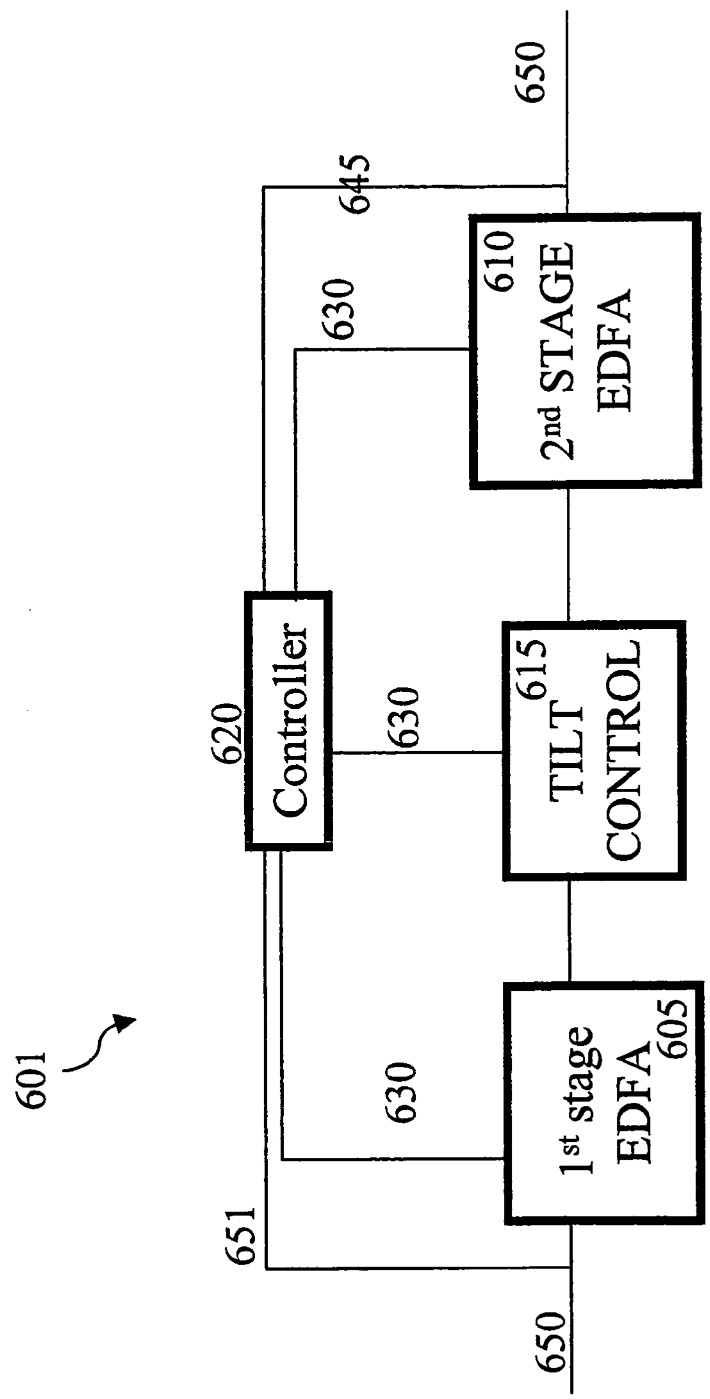
FIG. 4 is a block diagram of a two-stage inline amplifier and controller in accordance with the present invention.
Figure 5:
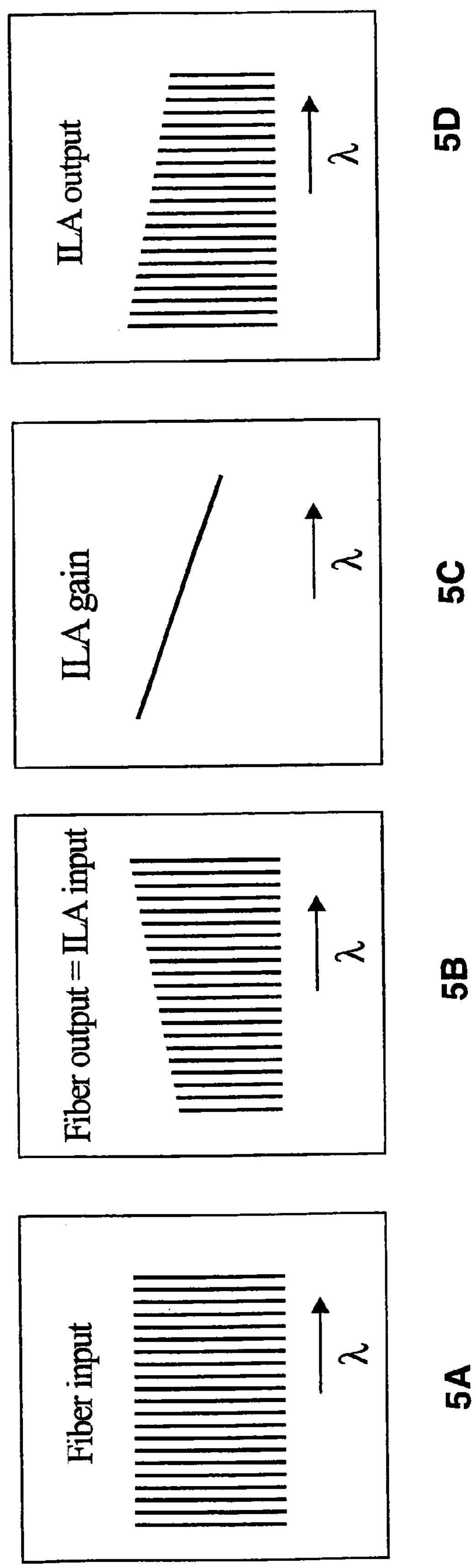
FIG. 5A shows fiber input power for an overcompensating prior art system.
FIG. 5B shows inline amplifier power input for an overcompensating prior art system.
FIG. 5C shows inline amplifier gain for an overcompensating prior art system.
FIG. 5D shows inline amplifier output for an overcompensating prior art system.

FIG. 4 shows a two-stage ILA 601 of the preferred embodiment. ILA 601 is placed inline of optical fiber span 650. The first stage is EDFA 605. A tap 651 reports the input power to EDFA 605 to controller 620. EDFA 605 is operationally connected to a tilt control unit 615. Tilt control 615 in the preferred embodiment is a variable optical attenuator (VOA). In an alternate embodiment, tilt control 615 may be a tunable filter as is known in the art. A second stage EDFA 616 is operationally connected to tilt control 615. The output power of second stage EDFA 610 is reported to controller 620 by tap 645. First stage EDFA 605, second stage EDFA 610 and tilt control unit 615 are all operationally connected to controller 620 by control line 630.

Figure 6:
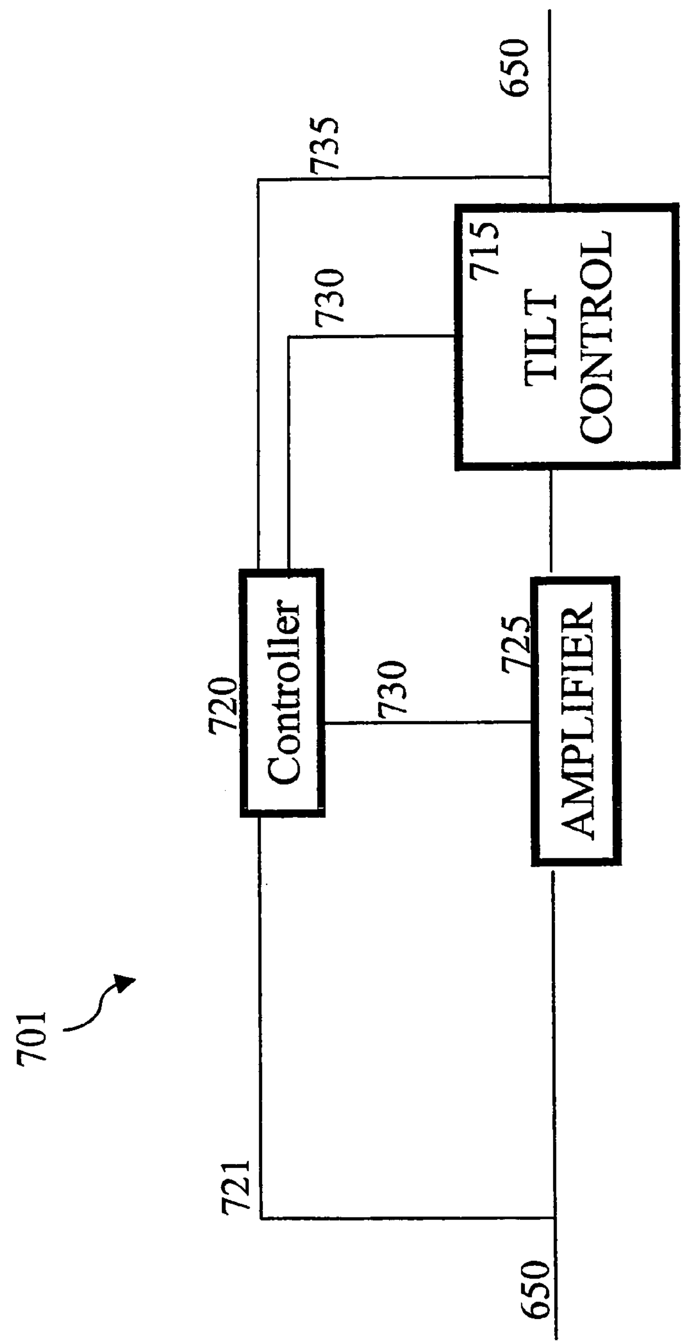
FIG. 6 shows a block diagram of a single inline amplifier and controller in accordance with an alternate embodiment of the present invention.

FIG. 6 shows an alternate embodiment of the invention in which gain tilt is controlled in a single stage inline amplifier 701. Inline amplifier 701 is placed inline of optical fiber span 650. Amplifier 725 is connected to optical fiber 650 and tilt control 715. Both amplifier 725 and tilt control 715 are operably connected to controller 720 by control line 730. A tap 721 communicates the input power to amplifier 725 to controller 720. A tap 735 communicates the output power of inline amplifier 701 to controller 720.

Figure 1:
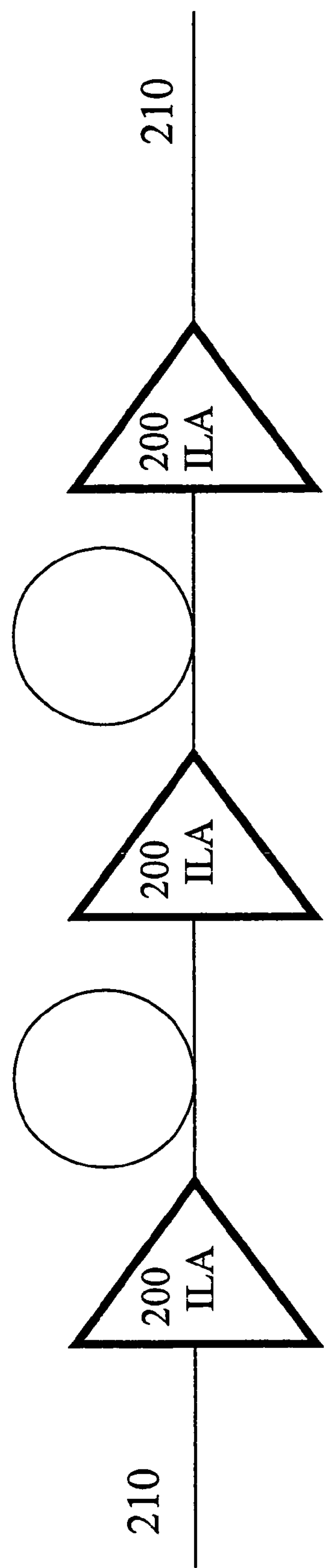
FIG. 1 is a block diagram of the use of in line amplifiers according to the prior art.
Figure 2:
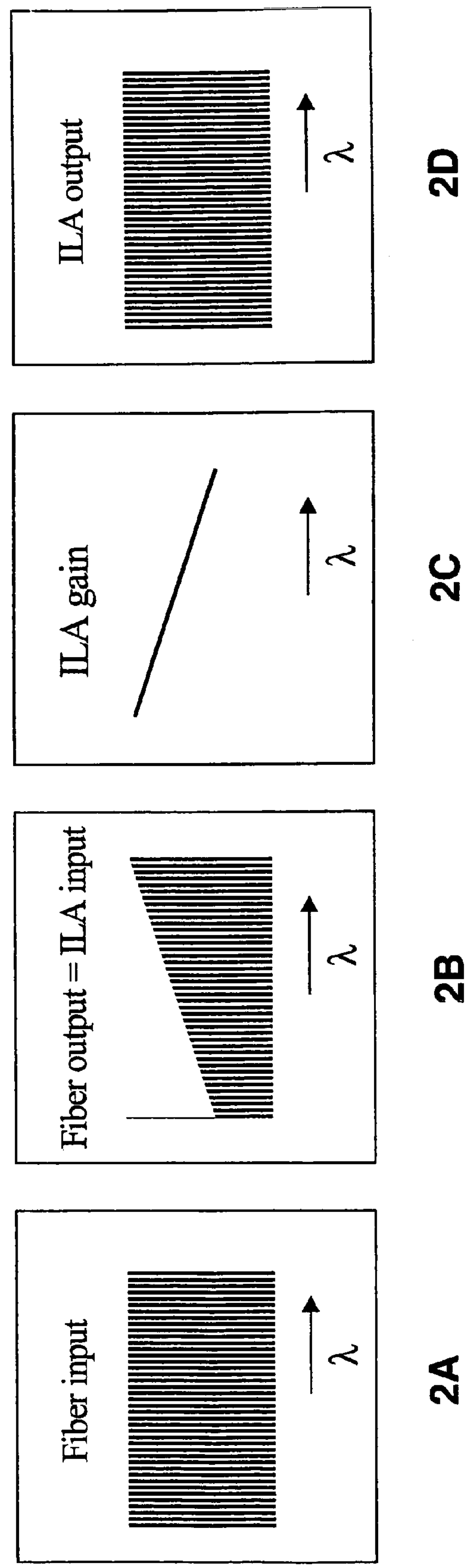
FIG. 2A shows fiber input power for a stable optical system.
FIG. 2B shows inline amplifier power input for a stable optical system.
FIG. 2C shows inline amplifier gain for a stable optical system.
FIG. 2D shows inline amplifier output for a stable optical system.
Figure 3:
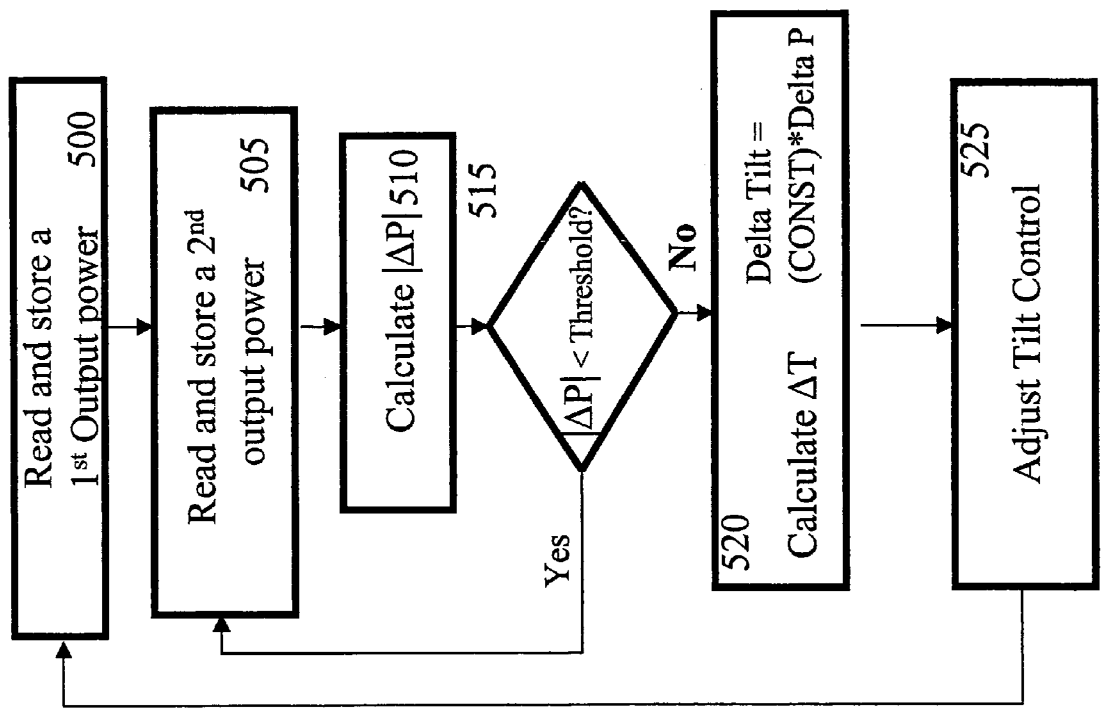
FIG. 3 is a flow chant showing an algorithm for adjusting the tilt gain in an ILA of the present invention.

FIG. 3 is a flow chart of the preferred embodiment of the present invention. In FIG. 3, output power of second stage EDFA 610 is read by controller 620 at tap 645 at step 500 and stored in memory. Then, the output power of second stage EDFA 610 is again read and stored at, step 505. Next, the change in output power is calculated by subtracting the first output power reading from the second output power reading at step 510. In an alternate embodiment described in relation, to FIG. 3, input power to first stage EDFA is read by controller 620 at tap 651 at step 500 and stored in memory. Then, the input power to first stage EDFA is again read and stored at step 505. Next, the change in input power is calculated by subtracting the first input power reading from the second input power reading at step 510. In yet another alternate embodiment, described in relation to FIGS. 3 and 6, input power to amplifier 725 is read by controller 720 at tap 721 at step 500 and stored in memory. Then, the input power to the amplifier is again read and stored at step 505. Next, the change in input power is calculated by subtracting the first input power reading from the second input power reading at step 510. In another alternate embodiment described in relation to FIGS. 3 and 6, output power to amplifier 725 is read by controller 720 at tap 735 at step 500 and stored in memory. Then, the output power to the amplifier is again read and stored at step 505. Next, the change in output power is calculated by subtracting the first output power reading from the second output power reading at step 510. For all embodiments, controller 620 then determines if the change in power is less than a threshold value, step 515. The threshold value is on the order of approximately 5 mW if the output power at tap 645 is measured, or approximately 20 μW if the input power at tap 651 is measured to avoid triggering the tilt control by noise in the system.

If the change in power is less than the threshold value, then the controller takes no action and allows the power to remain constant and loops back to step 505. If the change in power is determined to be greater than the threshold value at 515, then the change in ILA gain tilt is calculated by multiplying the change in power by a negative constant, step 520. The constant is set by controller 620 to reflect fiber type, fiber characteristics, or a default average of about 8 dB/W. Controller 620 then transmits a signal to adjust the tilt control by the calculated change in tilt, step 525. After adjusting the tilt control, controller 620 loops back to step 500.

The invention provides for three different types of tilt control. First, tilt control may be provided by a single stage, double stage or multi-stage amplifier combined with a VOA. To change the tilt, the VOA is activated to attenuate all wavelengths equally. To compensate for the attenuation, the gain of one or more stages of the amplifier is increased. The tilt is changed due to the larger gain of the amplifier stages even though the overall gain of the amplifier-VOA combination remains constant.

In a second embodiment, a dynamic gain equalizer (DOE) attenuates the loss from the amplifiers on a channel-by-channel or band-by-band basis. The dynamic gain equalizer can be adjusted without adjusting the amplifiers.

In a third embodiment, an optical filter can be designed to introduce a broadband tilt. This tilt can be tuned by changing the voltage or similar adjustment of the optical filter.

Because of the simplicity of the algorithm and because the algorithm reins on the hardware within the ILA to be adjusted, adjustments can be made to the gain tilt within approximately 100 μs and system failures from upstream channel failure caused by negative tilt accumulation are avoided. Manual tilt changes, tilt changes via the management channel, triggered by a tuning algorithm, or any other methods for making tilt changes are still possible.

Although the invention has been described with reference to one or more preferred embodiments, this description is not to be construed in a limiting sense. There is modification of the disclosed embodiments, as well as alternative embodiments of this invention, which will be apparent to persons of ordinary skill in the art, and the invention shall be viewed as limited only by reference to the following claims.

The invention claimed is:

1. A computer-readable medium having stored thereon computer-executable instructions for compensating for spectral power tilt of a signal in an optical fiber, the computer-executable instructions comprising instructions for:

comparing a first power of an amplifier with a second, subsequent power of the amplifier to determine change in power;

comparing the change in power to a predetermined threshold value;

determining whether the change in power is equal to, or greater than, the predetermined threshold value; and adjusting a gain tilt of the amplifier to compensate for the spectral power tilt of the signal based on a result of the determination.

2. The computer-readable medium of claim 1, wherein the computer-executable instructions further comprise instructions for:

calculating a compensation gain tilt to compensate for the spectral power tilt of the signal; and adjusting the gain tilt of the amplifier based on the calculated compensation gain tilt.

3. The computer-readable medium of claim 2, wherein the compensation gain tilt is calculated by multiplying the change in power by a negative constant.

4. The computer-readable medium of claim 3, wherein the negative constant is about 8 dB/W.

5. The computer-readable medium of claim 1, wherein the computer-executable instructions further comprise instructions for measuring the first and second powers of the amplifier.

6. The computer-readable medium of claim 5, wherein the first power includes a first input power of the amplifier and the second power includes a second, subsequent input power of the amplifier.

7. The computer-readable medium of claim 6, wherein the predetermined threshold value is approximately 20 μW.

8. The computer-readable medium of claim 5, wherein the first power includes a first output power of the amplifier and the second power includes a second, subsequent output power of the amplifier.

9. The computer-readable medium of claim 8, wherein the predetermined threshold value is approximately 5 mW.

10. The computer-readable medium of claim 1, wherein the gain tilt of the amplifier is adjusted within approximately 100 μs.

11. The computer-readable medium of claim 1, wherein the gain tilt of the amplifier is adjusted via a variable optical attenuator.

12. The computer-readable medium of claim 1, wherein the gain tilt of the amplifier is adjusted via a dynamic gain equalizer.

13. The computer-readable medium of claim 1, wherein the gain tilt of the amplifier is adjusted via an optical filter.

14. A method for compensating for spectral power tilt of a signal in an optical fiber, the method comprising:

comparing a first power of an amplifier with a second, subsequent power of the amplifier to determine a change in power;

comparing the change in power to a predetermined threshold value;

determining whether the change in power is equal to, or greater than, the predetermined threshold value; and adjusting a gain tilt of the amplifier to compensate for the spectral power tilt of the signal based on a result of the determination.

15. The method of claim 14 further comprising:

calculating a compensation gain tilt to compensate for the spectral power tilt of the signal; and adjusting the gain tilt of the amplifier based on the calculated compensation gain tilt.

16. The method of claim 15, wherein the compensation gain tilt is calculated by multiplying the change in power by a negative constant.

17. The method of claim 16, wherein the negative constant is about 8 dB/W.

18. The method of claim 14 further comprising measuring the first and second powers of the amplifier.

19. The method of claim 18, wherein the first power includes a first input power of the amplifier and the second power includes a second, subsequent input power of the amplifier.

20. The method of claim 19, wherein the predetermined threshold value is approximately 20 μW.

21. The method of claim 18, wherein the first power includes a first output power of the amplifier and the second power includes a second, subsequent output power of the amplifier.

22. The method of claim 21, wherein the predetermined threshold value is approximately 5 mW.

23. The method of claim 14, wherein the gain tilt of the amplifier is adjusted within approximately 100 μs.

24. The method of claim 14, wherein the gain tilt of the amplifier is adjusted via a variable optical attenuator.

25. The method of claim 14, wherein the gain tilt of the amplifier is adjusted via a dynamic gain equalizer.

26. The method of claim 14, wherein the gain tilt of the amplifier is adjusted via an optical filter.

* * * * *

UNITED STATES PATENT AND TRADEMARK OFFICE

CERTIFICATE OF CORRECTION

PATENT NO. : 7,443,576 B2
APPLICATION NO. : 11/515438
DATED : October 28, 2008
INVENTOR(S) : Michael H. Eiselt It is certified that error appears in the above-identified patent and that said Letters Patent is hereby corrected as shown below:

On the Title Page,
Item (56) References Cited
U.S. PATENT DOCUMENTS
Insert the following missing references:
--6,163,636 12/2000 Stentz et al.
6,173,094 01/2001 Bowerman et al.
6,177,985 01/2001 Bloom
6,198,559 03/2001 Gehlot
6,212,001 04/2001 Bode et al.
6,229,599 05/2001 Galtarossa
6,236,481 05/2001 Laor
6,236,499 05/2001 Berg et al.
6,246,510 06/2001 BuAbbud et al.
6,259,553 07/2001 Kinoshita
6,259,554 07/2001 Shigematsu et al.
6,259,693 07/2001 Ganmukhi et al.
6,259,845 07/2001 Sardesai
6,272,185 08/2001 Brown
6,275,315 08/2001 Park et al.
6,288,811 09/2001 Jiang et al.
6,288,813 09/2001 Kirkpatrick et al.
6,307,656 10/2001 Terahara--.

On the Title Page,
Item (57), ABSTRACT,
Line 10, delete "cam" and insert --can--.

Column 5,
Line 16, after "determine" insert --a--.

Signed and Sealed this

Twenty-third Day of March, 2010

David J. Kappos
*Director of the United States Patent and Trademark Office*